United States Patent
Katahira (10) Patent No.: US 11,429,325 B2
(45) Date of Patent: Aug. 30, 2022

(54) IMAGE FORMING APPARATUS WITH IMPROVED MECHANISMS FOR DISPLAYING A STATE OF A RECHARGEABLE BATTERY, AND CONTROL METHOD AND STORAGE MEDIUM THEREOF

(71) Applicant: CANON KABUSHIKI KAISHA, Tokyo (JP)

(72) Inventor: Yuka Katahira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/180,521

(22) Filed: Feb. 19, 2021

(65) Prior Publication Data

US 2021/0265851 A1    Aug. 26, 2021

(30) Foreign Application Priority Data

Feb. 25, 2020  (JP) .............................. JP2020-029771

(51) Int. Cl.
  *G06F 3/12*   (2006.01)
  *H04N 1/00*   (2006.01)
  *G06K 15/00*  (2006.01)
  *H02J 7/00*   (2006.01)

(52) U.S. Cl.
  CPC ......... *G06F 3/1229* (2013.01); *G06K 15/409* (2013.01); *G06K 15/4055* (2013.01); *H04N 1/00896* (2013.01); *H04N 1/00899* (2013.01); *H04N 1/00901* (2013.01); *H04N 1/00907* (2013.01); *G06F 3/121* (2013.01); *H02J 7/0048* (2020.01); *H02J 7/007192* (2020.01)

(58) Field of Classification Search
  None
  See application file for complete search history.

(56) References Cited

U.S. PATENT DOCUMENTS

| | | | | |
|---|---|---|---|---|
| 6,831,444 | B2* | 12/2004 | Kobayashi | H02J 7/0047 320/136 |
| 2009/0279883 | A1* | 11/2009 | Fujita | H04N 5/907 396/279 |
| 2015/0195417 | A1* | 7/2015 | Ohhashi | H04N 1/00901 358/1.14 |
| 2016/0064980 | A1* | 3/2016 | Jung | H02J 7/0047 320/162 |
| 2016/0188264 | A1* | 6/2016 | Shintani | G06F 3/1263 358/1.15 |
| 2020/0099814 | A1* | 3/2020 | Horita | H04N 1/00901 |
| 2020/0144842 | A1* | 5/2020 | Ha | H02J 7/0047 |
| 2020/0195028 | A1* | 6/2020 | Igarashi | H02J 7/0048 |
| 2021/0344810 | A1* | 11/2021 | Takahashi | H04N 1/00904 |

FOREIGN PATENT DOCUMENTS

JP    2003320738 A    11/2003

* cited by examiner

*Primary Examiner* — Miya J Williams
(74) *Attorney, Agent, or Firm* — Canon U.S.A., Inc. I.P. Division

(57) ABSTRACT

Various embodiments of the present disclosure provide techniques and mechanisms for improving user convenience by displaying the state of a battery of an image forming apparatus in more detail. In a case where the state of the battery is an abnormal state in which the battery is not chargeable, the image forming apparatus displays information indicating that the battery is in the abnormal state and information about a remaining capacity of the battery.

20 Claims, 6 Drawing Sheets

| INFORMATION TO BE DISPLAYED | ICON | |
|---|---|---|
| BATTERY UNCONNECTED | HIDDEN | —601 |
| BATTERY REMAINING CAPACITY, AND BATTERY CHARGING STATE | ⚡▮▮▮▮ | —602 |
| BATTERY REMAINING CAPACITY | ▮▮▮▮ | —603 |
| BATTERY REMAINING CAPACITY, AND LOW BATTERY WARNING | ⓘ ▯ | —604 |
| BATTERY REMAINING CAPACITY, AND ABNORMAL STATE OF BATTERY TEMPERATURE | 🌡▮▮▮▮ | —605 |
| BATTERY REMAINING CAPACITY, ABNORMAL STATE OF BATTERY TEMPERATURE, AND LOW BATTERY WARNING | ⓘ/🌡 ▯ | —606 |
| ABNORMAL STATE OF BATTERY TEMPERATURE, AND UNKNOWN REMAINING CAPACITY OF BATTERY | 🌡▨▨ | —607 |

| INFORMATION TO BE DISPLAYED | ICON | |
|---|---|---|
| BATTERY UNCONNECTED | HIDDEN | 601 |
| BATTERY REMAINING CAPACITY, AND BATTERY CHARGING STATE |  | 602 |
| BATTERY REMAINING CAPACITY |  | 603 |
| BATTERY REMAINING CAPACITY, AND LOW BATTERY WARNING |  | 604 |
| BATTERY REMAINING CAPACITY, AND ABNORMAL STATE OF BATTERY TEMPERATURE |  | 605 |
| BATTERY REMAINING CAPACITY, ABNORMAL STATE OF BATTERY TEMPERATURE, AND LOW BATTERY WARNING |  | 606 |
| ABNORMAL STATE OF BATTERY TEMPERATURE, AND UNKNOWN REMAINING CAPACITY OF BATTERY |  | 607 |

IMAGE FORMING APPARATUS WITH IMPROVED MECHANISMS FOR DISPLAYING A STATE OF A RECHARGEABLE BATTERY, AND CONTROL METHOD AND STORAGE MEDIUM THEREOF

BACKGROUND

Field

The present disclosure relates to an image forming apparatus, a control method, and a storage medium.

Description of the Related Art

Japanese Patent Application Laid-Open No. 2003-320738 discusses a printing apparatus equipped with a rechargeable battery.

Japanese Patent Application Laid-Open No. 2003-320738 discusses display of the remaining capacity of the rechargeable battery. However, there is a demand for improving user convenience by displaying the state of the rechargeable battery in more detail.

SUMMARY

According to various embodiments of the present disclosure, an image forming apparatus operable by power supplied from a battery includes a determination unit configured to determine a state of the battery, and a display control unit configured to, in a case where the determination unit determines that the battery is in an abnormal state in which the battery is not chargeable, concurrently display information indicating that the battery is in the abnormal state and information about a remaining capacity of the battery.

Further features of various embodiments of the present disclosure will become apparent from the following description of exemplary embodiments with reference to the attached drawings.

DESCRIPTION OF THE EMBODIMENTS

Figure 2:
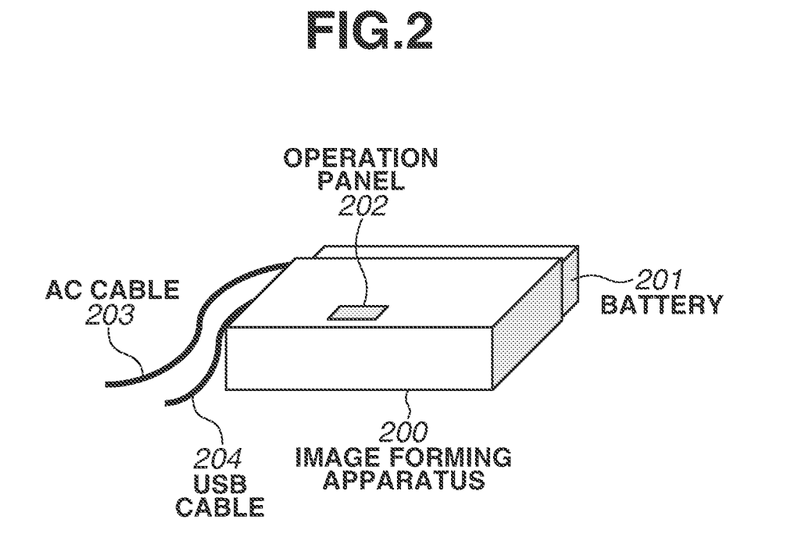
FIG. 2 is a schematic diagram illustrating an example of a configuration of the image forming apparatus according to one embodiment.

FIG. 2 illustrates an example of a configuration of an image forming apparatus 200 according to a first exemplary embodiment of the present disclosure. The image forming apparatus 200 includes a detachable battery 201, an operation panel 202 for displaying information desired by a user, and an alternating current (AC) cable 203. Power supplied via the AC cable 203 is used for print processing executed by the image forming apparatus 200 and for charging the battery 201. In the present exemplary embodiment, an ink jet method is described as an example of a print method of the image forming apparatus 200, but another method, for example, an electrophotographic method may be used.

The image forming apparatus 200 can be connected to a Universal Serial Bus (USB) cable 204. The image forming apparatus 200 receives print data from a host computer 308 (refer to FIG. 3) via the USB cable 204. In addition, the image forming apparatus 200 can charge the battery 201 with power supplied from the host computer 308 via the USB cable 204. In the present exemplary embodiment, charging via the USB cable 204 may be referred to as USB charging.

Both the AC cable 203 and the USB cable 204 can be attached to and detached from the image forming apparatus 200. The battery 201 can be charged using the AC cable 203 or the USB cable 204. In a case where both the AC cable 203 and the USB cable 204 are connected to the image forming apparatus 200 and can be used to charge the battery 201, the image forming apparatus 200 preferentially uses the AC cable 203 to charge the battery 201.

States of the image forming apparatus 200 include, for example, an idle state in which display processing on the operation panel 202 (display unit) is executed, but print processing is not executed, a printing state in which the display processing and the print processing based on print data are executed, and a power saving state in which neither the display processing nor the print processing are executed. In the power saving state, for example, power is not supplied to a motor control circuit 309 (refer to FIG. 3), a head control circuit 313 (refer to FIG. 3), or the operation panel 202, but is supplied to an interface control circuit 307 (refer to FIG. 3). In the idle state, for example, power is not supplied to the motor control circuit 309 or the head control circuit 313, but is supplied to the other units. In the printing state, for example, power is supplied to all the units. The states in descending order of power consumption are the printing state, the idle state, and the power saving state. In a case where the image forming apparatus 200 has not been operated by the user or has not received print data during a period after completion of the last processing and before lapse of a predetermined time, the image forming apparatus 200 shifts from the idle state to the power saving state. The charging using the AC cable 203 is performed in the idle state or the power saving state, but is not performed in the printing state. On the other hand, the charging using the USB cable 204 is performed in the power saving state, but is not performed in the idle state or the printing state.

In the present exemplary embodiment, both the AC cable 203 and the USB cable 204 are connected to the image forming apparatus 200, but the connection method is not limited thereto. For example, the AC cable 203 and the USB cable 204 may be connected to the battery 201.

Figure 3:
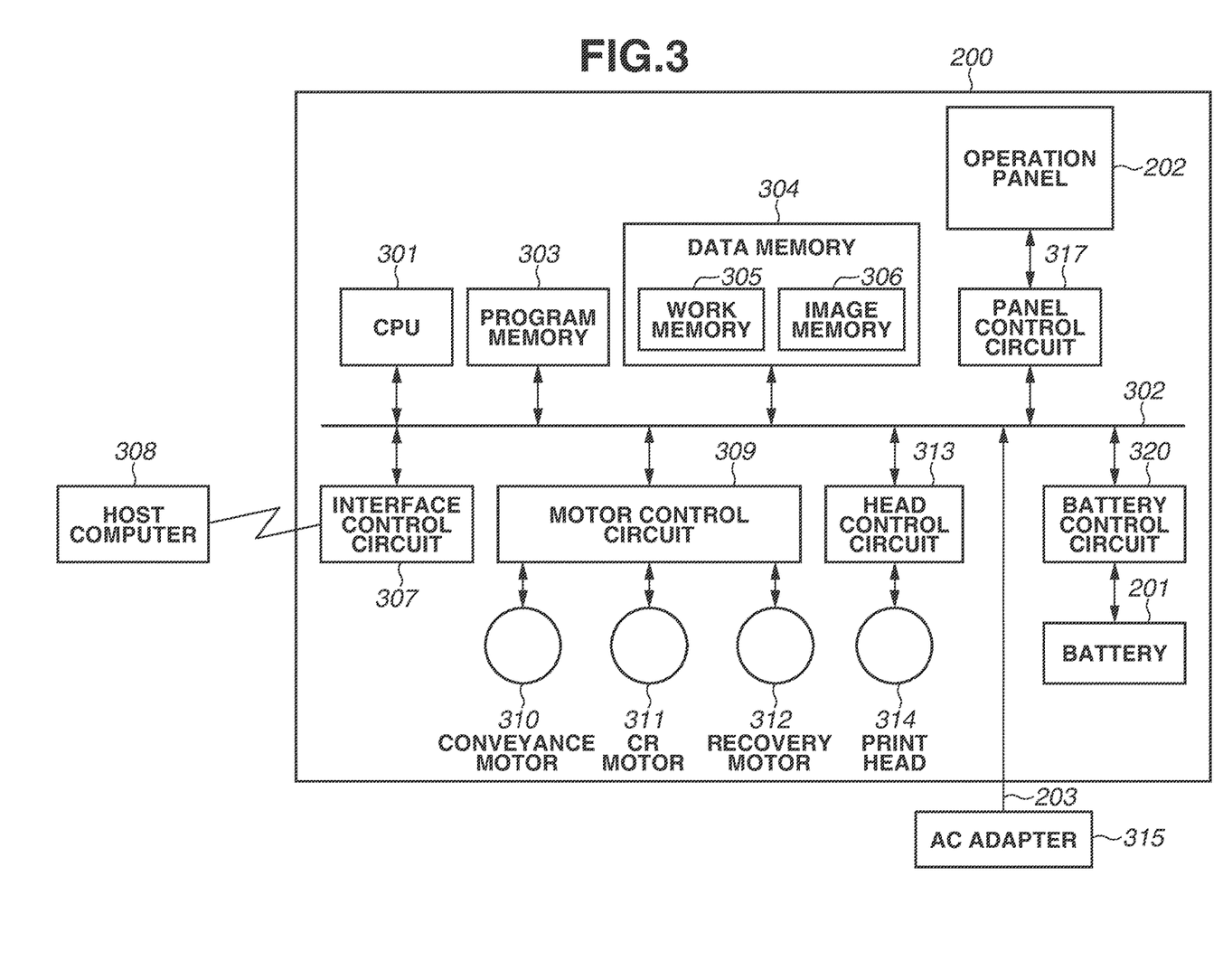
FIG. 3 is a block diagram illustrating an example of a hardware configuration of the image forming apparatus according to one embodiment.

FIG. 3 is a block diagram illustrating a hardware configuration of the image forming apparatus 200 according to the present exemplary embodiment.

A central processing unit (CPU) 301 reads and executes a program stored in a program memory 303 that is in the form of a read-only memory (ROM), and a program stored in a data memory 304 that is in the form of a random access memory (RAM). The program memory 303 and the data memory 304 are connected to the CPU 301 via an internal bus 302. The data memory 304 is used as a work memory 305 used by the CPU 301 to execute a control program, and as an image memory 306 for storing data of an image to be formed on a sheet.

The CPU 301 controls the interface control circuit 307 and receives print data from the host computer 308 connected thereto via an external interface. In addition, the CPU 301 controls the interface control circuit 307 and transmits status information of the image forming apparatus 200 to the host computer 308 via the external interface. In the present exemplary embodiment, the image forming apparatus 200 communicates with the host computer 308 via the USB cable 204 but may use another communication method (e.g., wireless communication).

The CPU 301 can control various types of motors (described below) for driving mechanisms in the image forming apparatus 200 via the motor control circuit 309. A conveyance motor 310 drives a sheet feed roller, a conveyance roller, and a sheet discharge roller to convey a sheet. A carriage motor 311 (indicated as a CR motor in FIG. 2) causes a carriage to reciprocate. A recovery motor 312 drives a head recovery mechanism to execute a recovery operation for maintaining a print head 314 in an appropriate condition by controlling the head recovery mechanism in synchronization with the driving of the carriage.

The CPU 301 can control the print head 314 via the head control circuit 313. The CPU 301 forms an image on a sheet by controlling the print head 314 in synchronization with reciprocating motion of the carriage.

The CPU 301 controls the operation panel 202 arranged on an outer surface of the image forming apparatus 200 via a panel control circuit 317. The operation panel 202 displays information about a state of the battery 201 and the like. The CPU 301 controls the battery 201 via a battery control circuit 320. The battery 201 can supply power to the image forming apparatus 200, and store the power supplied from an AC adapter 315 via the AC cable 203 or the power supplied from the host computer 308 via the USB cable 204. In other words, the image forming apparatus 200 is operable by the power supplied from the battery 201.

Figure 4:
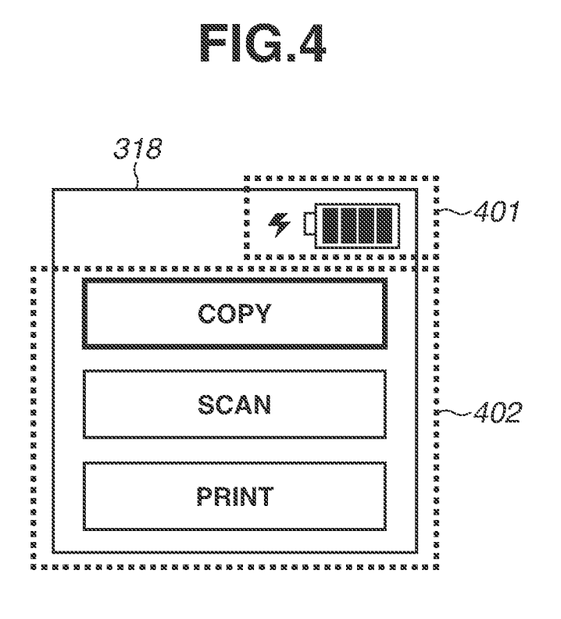
FIG. 4 is a diagram illustrating an example of information displayed on the operation panel according to one embodiment.

FIG. 4 illustrates an example of information displayed on the operation panel 202. In the present exemplary embodiment, a battery display item 401 indicating the state of the battery 201 and a user operation item 402 for receiving a user operation are displayed on the operation panel 202. The battery display item 401 and the user operation item 402 are not necessarily displayed concurrently on the same screen, and may be displayed on different screens. FIG. 4 illustrates a home screen that is displayed in a case where a power switch of the image forming apparatus 200 is turned ON.

The battery display item 401 is displayed in the form of an icon, and the icon is changed based on a remaining capacity of the battery 201 and the state of the battery 201. The battery display item 401 is not necessarily displayed in the form of an icon, and may be displayed in the form of text or any other form.

Figure 5:
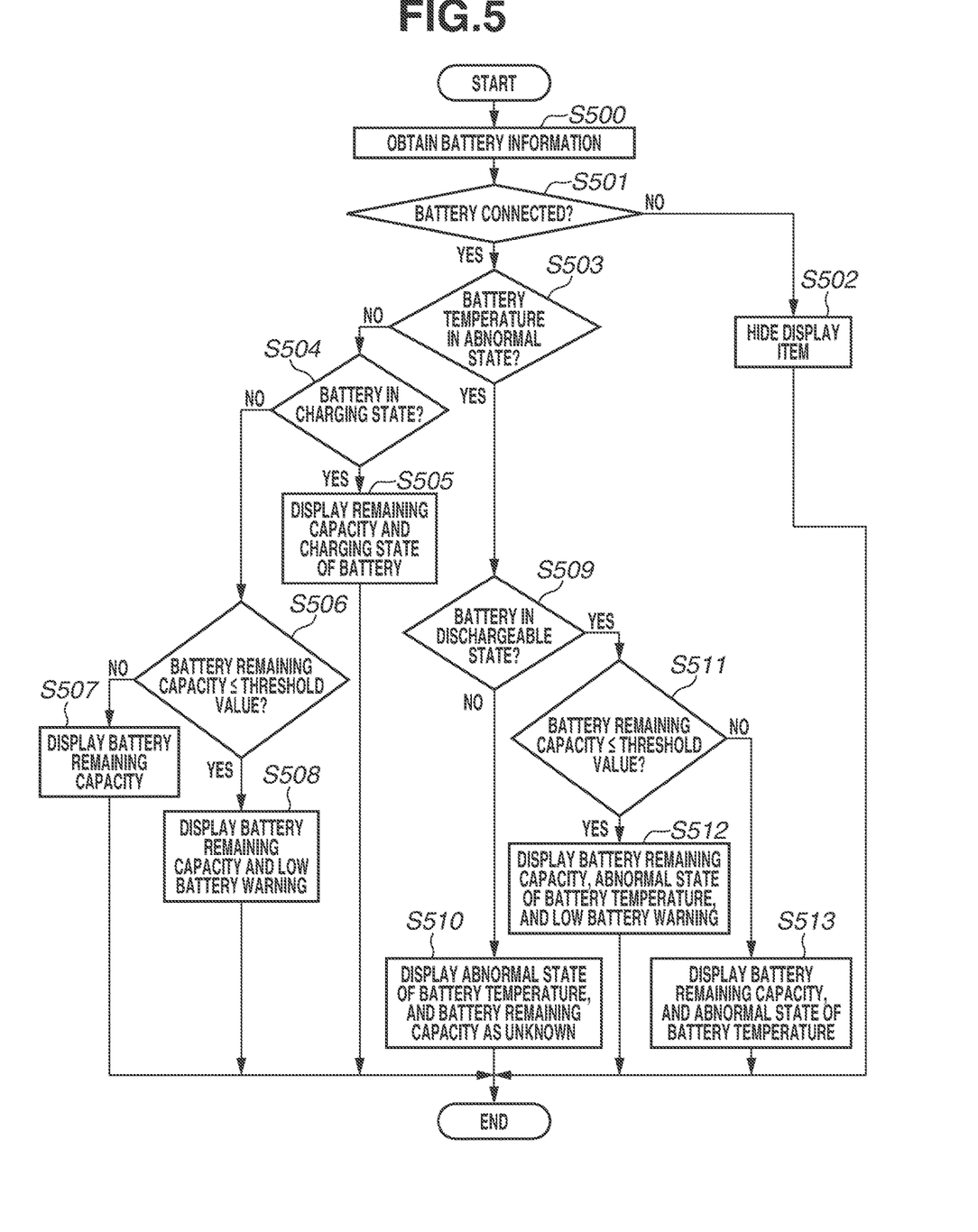
FIG. 5 is a flowchart illustrating processing for displaying battery information according to one embodiment.

FIG. 5 is a flowchart illustrating processing executed by the image forming apparatus 200 for controlling display of the state of the battery 201. The processing in FIG. 5 is implemented by the CPU 301 reading and executing a program necessary for the processing in the flowchart. The processing in FIG. 5 is executed in a case where the home screen illustrated in FIG. 4 is displayed.

In step S500, the CPU 301 obtains information necessary for displaying the state of the battery 201 from the battery 201 via the battery control circuit 320. The information obtained in step S500 includes, for example, mounting information indicating that the battery 201 is connected to the image forming apparatus 200, and information about the remaining capacity of the battery 201. In addition to these pieces of information, charging state information indicating whether the battery 201 is in a charging state, and temperature information of the battery 201, may be obtained.

The CPU 301 then performs processing for displaying the battery display item 401 based on the information obtained in step S500. In step S501, the CPU 301 determines whether the battery 201 is connected. For example, the CPU 301 may perform the determination processing in step S501 depending on whether the mounting information has been obtained. In a case where the CPU 301 determines that the battery 201 is connected as a result of the determination (YES in step S501), the CPU 301 then performs determination processing in step S503. On the other hand, in a case where the CPU 301 determines that the battery 201 is not connected (NO in step S501), then in step S502, the CPU 301 hides the battery display item 401. In the present exemplary embodiment, the battery display item 401 is hidden to notify the user that the battery 201 is unconnected. Alternatively, in step S502, an icon for indicating that the battery 201 is unconnected may be displayed.

In a case where the CPU 301 determines that the battery 201 is connected (YES in step S501), then in step S503, the CPU 301 determines whether a temperature of the battery 201 is in an abnormal state. More specifically, the CPU 301 determines whether a temperature indicated by the temperature information obtained from the battery 201 is higher than a first high temperature threshold value. The CPU 301 further determines whether the temperature indicated by the temperature information obtained from the battery 201 is lower than a first low temperature threshold value. In a case where the temperature indicated by the temperature information obtained from the battery 201 is determined to be higher than the first high temperature threshold value or lower than the first low temperature threshold value, the CPU 301 determines that the temperature of the battery 201 is in an abnormal state. On the other hand, in a case where the temperature indicated by the temperature information obtained from the battery 201 is determined to be between the first high temperature threshold value and the first low temperature threshold value, the CPU 301 determines that the temperature of the battery 201 is not in an abnormal state. In the present exemplary embodiment, in a case where the temperature of the battery 201 is in an abnormal state, the battery 201 cannot be charged.

In a case where the CPU 301 determines that the temperature of the battery 201 is not in an abnormal state (NO in step S503), then in step S504, the CPU 301 determines whether the battery 201 is in a charging state. As described above, the charging using the AC cable 203 is performed in the idle state, but the charging using the USB cable 204 is not performed in the idle state. Thus, the case where the CPU 301 determines that the battery 201 is in a charging state in step S504 corresponds to the charging state using the AC cable 203.

Figure 6:
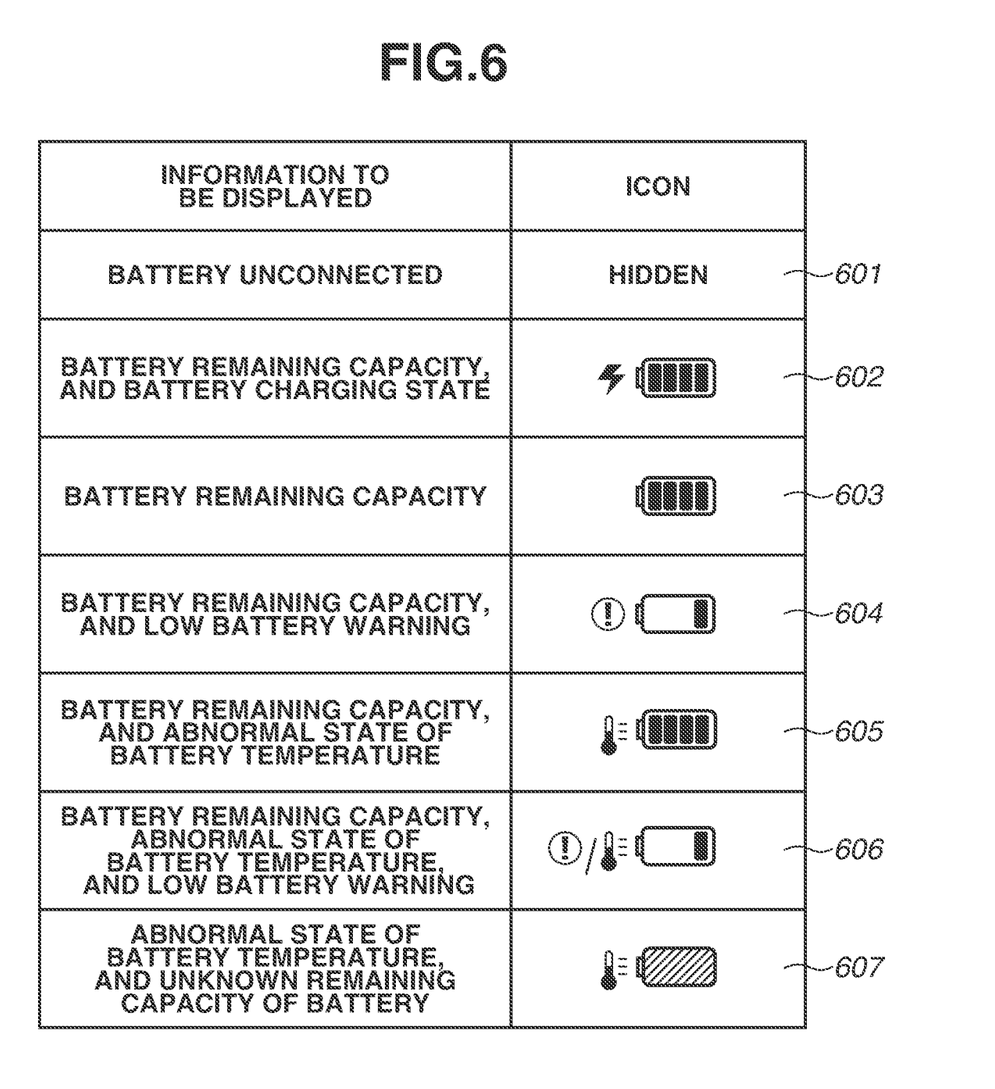
FIG. 6 is a table illustrating examples of icons to be displayed on the operation panel according to one embodiment.

In a case where the CPU 301 determines that the battery 201 is in a charging state (YES in step S504), then in step S505, the CPU 301 displays the information about the remaining capacity of the battery 201, and information indicating that the battery 201 is in a charging state. For example, in step S505, the CPU 301 displays an icon 602 illustrated in FIG. 6. The remaining capacity of the battery 201 is determined based on an amount of electric charge remaining in the battery 201.

On the other hand, in a case where the CPU 301 determines that the battery 201 is not in a charging state (NO in step S504), then in step S506, the CPU 301 determines whether a value indicating the remaining capacity of the battery 201 is a threshold value or less. The threshold value is an arbitrary value used to determine whether to display a warning for prompting the user to charge the battery 201. In a case where the CPU 301 determines that the value indicating the remaining capacity of the battery 201 is more than the threshold value (NO in step S506), then in step S507, the CPU 301 displays only the information about the remaining capacity of the battery 201 as the battery display item 401. For example, in step S507, the CPU 301 displays an icon 603 illustrated in FIG. 6.

In step S506, in a case where the CPU 301 determines that the value indicating the remaining capacity of the battery 201 is the threshold value or less (YES in step S506), then in step S508, the CPU 301 displays, in addition to the information about the remaining capacity of the battery 201, a warning indicating that the remaining capacity is low and prompting the user to charge the battery 201. For example, in step S508, the CPU 301 displays an icon 604 illustrated in FIG. 6. In the present exemplary embodiment, in a case where the CPU 301 determines in step S504 that the battery 201 is in a charging state, the CPU 301 does not display the warning indicating that the remaining capacity of the battery 201 is low, but may perform another processing. For example, in a case where the CPU 301 determines in step S504 that the battery 201 is in a charging state, the CPU 301 may perform the determination in step S506. In a case where the remaining capacity of the battery 201 is determined to be the threshold value or less as a result of the determination, the CPU 301 may display the warning indicating that the remaining capacity is low, in addition to the information indicating the remaining capacity and the charging state of the battery 201.

In step S503, in a case where the CPU 301 determines that the temperature of the battery 201 is in an abnormal state (YES in step S503), then in step S509, the CPU 301 determines whether the battery 201 is in a dischargeable state. More specifically, the CPU 301 determines whether the temperature indicated by the temperature information obtained from the battery 201 is higher than a second high temperature threshold value. The CPU 301 further determines whether the temperature indicated by the temperature information obtained from the battery 201 is lower than a second low temperature threshold value. A temperature indicated by the second high temperature threshold value is higher than a temperature indicated by the first high temperature threshold value. A temperature indicated by the second low temperature threshold value is lower than a temperature indicated by the first low temperature threshold value. In a case where the temperature indicated by the temperature information obtained from the battery 201 is determined to be higher than the second high temperature threshold value or lower than the second low temperature threshold value, the CPU 301 determines that the battery 201 is not in a dischargeable state. On the other hand, in a case where the temperature indicated by the temperature information obtained from the battery 201 is between the first high temperature threshold value and the second high temperature threshold value or between the first low temperature threshold value and the second low temperature threshold value, the CPU 301 determines that the battery 201 is in a dischargeable state.

In a case where the CPU 301 determines that the battery 201 is not in a dischargeable state (NO in step S509), then in step S510, the CPU 301 displays the information indicating that the temperature of the battery 201 is in an abnormal state and the remaining capacity of the battery 201 is unknown. For example, in step S510, the CPU 301 displays an icon 607 illustrated in FIG. 6. In a case where the determination is YES in step S503 and NO in step S509, the battery 201 is neither in a chargeable state nor in a dischargeable state, and thus this state may be referred to as a charging and discharging abnormality state.

In step S509, in a case where the CPU 301 determines that the battery 201 is in a dischargeable state (YES in step S509), then in step S511, the CPU 301 determines whether the value indicating the remaining capacity of the battery 201 is the threshold value or less, similarly to step S506. In a case where the CPU 301 determines that the remaining capacity of the battery 201 is more than the threshold value (NO in step S511), then in step S513, the CPU 301 displays the information about the remaining capacity of the battery 201 and the information indicating the abnormal state of the temperature. For example, in step S513, the CPU 301 displays an icon 605 illustrated in FIG. 6.

On the other hand, in step S511, in a case where the CPU 301 determines that the remaining capacity of the battery 201 is the threshold value or less (YES in step S511), then in step S512, the CPU 301 displays the information about the remaining capacity of the battery 201, the information indicating the abnormal state of the temperature, and the warning indicating that the remaining capacity is low. For example, in step S512, the CPU 301 displays an icon 606 illustrated in FIG. 6. In a case where the determination is YES in step S503 and YES in step S509, the battery 201 is not in a chargeable state but is in a dischargeable state, and thus this state may be referred to as a charging abnormality state. In other words, the processing in step S512 or S513 is executed in a charging abnormality state.

In the present exemplary embodiment, information based on the state of the battery 201 is displayed on the operation panel 202, so that the user can easily recognize the state of the battery 201. For example, in the present exemplary embodiment, the processing in step S512 or S513 is performed, so that the remaining capacity of the battery 201 can be displayed even if the temperature of the battery 201 is in an abnormal state, thereby improving user operability.

As described above, the battery 201 may be charged, for example, with the power supplied from the host computer 308 via the USB cable 204. In a case where a connection destination of the USB cable 204 is an electronic device such as the host computer 308, the user may not wish to supply the power from the electronic device to the image forming apparatus 200. Thus, the image forming apparatus 200 according to the present exemplary embodiment allows the user to select whether to enable or disable charging from the USB cable 204. For example, the image forming apparatus 200 displays, on the operation panel 202, a screen 101 illustrated in FIG. 1A. In a case where the user selects "Enable" on the screen 101 illustrated in FIG. 1A and the image forming apparatus 200 shifts to the power saving state, the image forming apparatus 200 starts to charge the battery 201 with the power supplied via the USB cable 204. In a case where the user selects "Enable" on the screen 101 illustrated in FIG. 1A, a screen 102 illustrated in FIG. 1B is to be displayed.

Figure 1A:
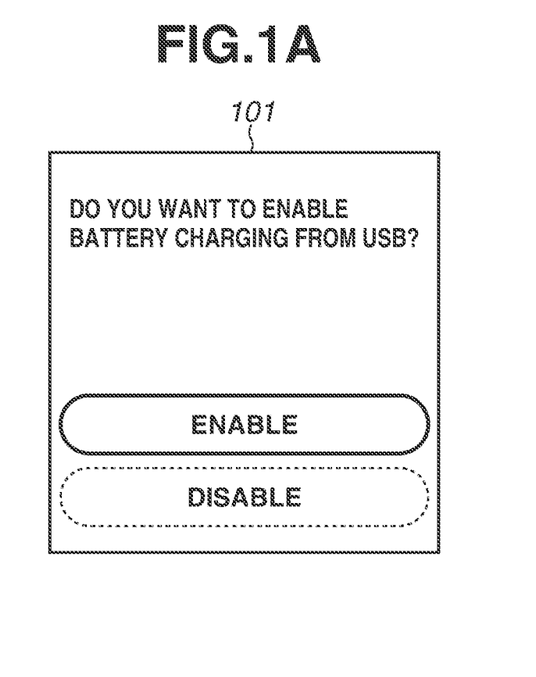
FIGS. 1A and 1B are diagrams each illustrating an example of a screen displayed on an operation panel of an image forming apparatus according to one embodiment.
Figure 1B:
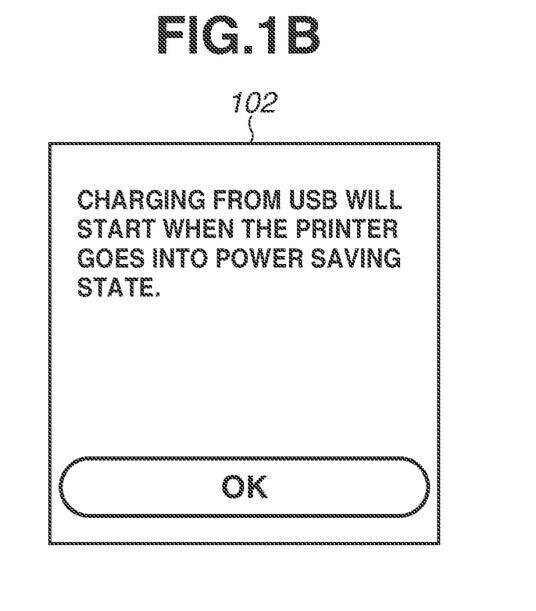

On the other hand, in a case where the user selects "Disable" on the screen 101 illustrated in FIG. 1A, the image forming apparatus 200 does not start to charge the battery 201 via the USB cable 204 even when the image forming apparatus 200 shifts to the power saving state. Even when the charging from the USB cable 204 is set to be disabled, the image forming apparatus 200 can start to charge the battery 201 via the AC cable 203. The image forming apparatus 200 receives a setting for enabling or disabling the charging from the USB cable 204, regardless of whether the battery 201 is connected to the image forming apparatus 200. In addition, the image forming apparatus 200 receives the setting for enabling or disabling the charging from the USB cable 204, regardless of whether the USB cable 204 is connected to the image forming apparatus 200. In a case where the CPU 301 recognizes that the host computer 308 is connected to the image forming apparatus 200 via the USB cable 204 and where the USB charging is set to be disabled, the CPU 301 may display the screen 101 illustrated in FIG. 1A. Furthermore, in a case where the CPU 301 recognizes that the host computer 308 is connected to the image forming apparatus 200 via the USB cable 204 and where the screen 101 illustrated in FIG. 1A has never been displayed, the CPU 301 may display the screen 101 illustrated in FIG. 1A.

In the above-described exemplary embodiment, the temperature of the battery 201 has been described as an example of a cause of the charging abnormality of the battery 201 and the charging and discharging abnormality of the battery 201. However, the charging abnormality and the charging and discharging abnormality may occur due to other causes. The other causes include, for example, leakage of the battery 201, and reduced charging capability due to exhaustion of the battery 201. In this case, an icon indicating the leakage of the battery 201 or an icon indicating the reduced charging capability may be displayed as with the icons 605 to 607 illustrated in FIG. 6.

In the above-described exemplary embodiment, the image forming apparatus 200 has been described as an example, but the above-described processing may be performed by another apparatus. For example, the above-described processing may be performed by a digital camera, a smartphone, or a laptop computer.

The above-described exemplary embodiment can also be implemented by executing the following processing. More specifically, software (a program) for implementing the functions according to the above-described exemplary embodiment is supplied to a system or an apparatus via a network or various storage media. Then, a computer (e.g., a CPU, a micro processing unit (MPU), or a processor) of the system or the apparatus reads and executes the program. The program may be executed by a single computer or a plurality of computers in conjunction with each other. Furthermore, it is not necessary to implement all the above-described processing using the software, and a part or all of the processing may be implemented by hardware such as an application specific integrated circuit (ASIC).

In addition, the CPU 301 is not limited to a single CPU that executes all the processing. A plurality of CPUs may execute the processing while appropriately cooperating with each other.

According to the present disclosure, the user can easily recognize the state of the battery.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-029771, filed Feb. 25, 2020, which is hereby incorporated by reference herein in its entirety.

What is claimed is:

1. An image forming apparatus operable by power supplied from a battery, the image forming apparatus comprising:
a memory; and
at least one processor in communication with the memory, wherein the at least one processor of the image forming apparatus is configured to perform:
determining a state of the battery;
(a) in a case where the determined state of the battery corresponds to a state in which the battery is not chargeable but dischargeable, displaying information indicating that the battery is in an abnormal state and information about a remaining capacity of the battery; and
(b) in a case where the determined state of the battery corresponds to a state in which the battery is neither chargeable nor dischargeable, displaying the information indicating that the battery is in the abnormal state and not displaying the information about the remaining capacity of the battery.

2. The image forming apparatus according to claim 1, wherein, in a case where a temperature indicated by temperature information of the battery is higher than a first high temperature threshold value or lower than a first low temperature threshold value, the determination unit determines that the battery is in the abnormal state in which the battery is not chargeable.

3. The image forming apparatus according to claim 2, wherein, in a case where the temperature indicated by the temperature information of the battery is higher than a second high temperature threshold value or lower than a second low temperature threshold value, the determination unit determines that the battery is in the charging and discharging abnormality state, and wherein a temperature indicated by the second high temperature threshold value is higher than a temperature indicated by the first high temperature threshold value, and a temperature indicated by the second low temperature threshold value is lower than a temperature indicated by the first low temperature threshold value.

4. The image forming apparatus according to claim 1, wherein, in a case where the remaining capacity of the battery is equal to or less than a threshold value, the display control unit displays information for prompting charging of the battery.

5. The image forming apparatus according to claim 1, further comprising a setting unit configured to set whether to execute Universal Serial Bus (USB) charging for charging the battery with power supplied from an electronic device via a USB cable.

6. The image forming apparatus according to claim 5, wherein, in a case where the image forming apparatus shifts to a power saving state in which display processing on a display unit in the image forming apparatus is not executed and where the setting unit sets the execution of the USB charging, the battery is charged with the power supplied from the electronic device via the USB cable.

7. A method for controlling an image forming apparatus operable by power supplied from a battery, the method comprising:
    determining a state of the battery;
    (a) in a case where the determined state of the battery corresponds to a state in which the battery is not chargeable but dischargeable, displaying information indicating that the battery is in an abnormal state and information about a remaining capacity of the battery; and
    (b) in a case where the determined state of the battery corresponds to a state in which the battery is neither chargeable nor dischargeable, displaying the information indicating that the battery is in the abnormal state and not displaying the information about the remaining capacity of the battery.

8. The method according to claim 7, wherein, in a case where a temperature indicated by temperature information of the battery is higher than a first high temperature threshold value or lower than a first low temperature threshold value, the battery is determined to be in the abnormal state in which the battery is not chargeable.

9. The method according to claim 8,
    wherein, in a case where the temperature indicated by the temperature information of the battery is higher than a second high temperature threshold value or lower than a second low temperature threshold value, the battery is determined to be in the charging and discharging abnormality state, and
    wherein a temperature indicated by the second high temperature threshold value is higher than a temperature indicated by the first high temperature threshold value, and a temperature indicated by the second low temperature threshold value is lower than a temperature indicated by the first low temperature threshold value.

10. The method according to claim 7, wherein, in a case where the remaining capacity of the battery is equal to or less than a threshold value, information for prompting charging of the battery is displayed.

11. The method according to claim 7, further comprising setting whether to execute Universal Serial Bus (USB) charging for charging the battery with power supplied from an electronic device via a USB cable.

12. The method according to claim 11, wherein, in a case where the image forming apparatus shifts to a power saving state in which display processing on a display unit in the image forming apparatus is not executed and where the USB charging is set to be executed, the battery is charged with the power supplied from the electronic device via the USB cable.

13. A non-transitory computer-readable storage medium storing a program for causing a computer to execute a method for controlling an image forming apparatus operable by power supplied from a battery, the method comprising:
    determining a state of the battery;
    (a) in a case where the determined state of the battery corresponds to a state in which the battery is not chargeable but dischargeable, displaying information indicating that the battery is in an abnormal state and information about a remaining capacity of the battery; and
    (b) in a case where the determined state of the battery corresponds to a state in which the battery is neither chargeable nor dischargeable, displaying the information indicating that the battery is in the abnormal state and not displaying the information about the remaining capacity of the battery.

14. The non-transitory computer-readable storage medium according to claim 13, wherein, in a case where a temperature indicated by temperature information of the battery is higher than a first high temperature threshold value or lower than a first low temperature threshold value, the battery is determined to be in the abnormal state in which the battery is not chargeable.

15. The non-transitory computer-readable storage medium according to claim 14,
    wherein, in a case where the temperature indicated by the temperature information of the battery is higher than a second high temperature threshold value or lower than a second low temperature threshold value, the battery is determined to be in the charging and discharging abnormality state, and
    wherein a temperature indicated by the second high temperature threshold value is higher than a temperature indicated by the first high temperature threshold value, and a temperature indicated by the second low temperature threshold value is lower than a temperature indicated by the first low temperature threshold value.

16. The non-transitory computer-readable storage medium according to claim 13, wherein, in a case where the remaining capacity of the battery is equal to or less than a threshold value, information for prompting charging of the battery is displayed.

17. The non-transitory computer-readable storage medium according to claim 13, wherein the method further comprises setting whether to execute Universal Serial Bus (USB) charging for charging the battery with power supplied from an electronic device via a USB cable.

18. An image forming apparatus operable by power supplied from a battery, the image forming apparatus comprising:
    a memory; and
    at least one processor in communication with the memory,
        wherein the at least one processor of the image forming apparatus is configured to perform:
        executing USB charging for charging the battery with power supplied from an electric device via a USB cable,
        wherein the battery is charged with the power supplied from the electric device via the USB cable on a condition that the image forming apparatus shifts to a power saving state in which display processing on a display unit in the image forming apparatus is not executed.

19. The image forming apparatus according to claim 18, the at least one processor further perform:
   setting whether to execute the USB charging; and
   controlling whether to execute the USB charging, based on the setting.

20. The image forming apparatus according to claim 1, wherein the determining includes first determination for determining whether the battery is chargeable and second determination for determining whether the battery is dischargeable.

* * * * *